United States Patent [19]

Long

[11] 3,830,967

[45] Aug. 20, 1974

[54] APPARATUS FOR HALF TONE MARKING ELECTROSTATIC PAPER

[75] Inventor: John H. Long, Oakland, N.J.

[73] Assignee: Muirhead, Inc., Mountainside, N.J.

[22] Filed: Feb. 5, 1973

[21] Appl. No.: 329,649

[52] U.S. Cl. .......... 178/6.6 A, 346/74 ES
[51] Int. Cl. .......... H04n 5/80, G01d 15/06
[58] Field of Search .......... 178/6.6 A, 6.6 B; 346/74 E, 74 ES, 74 S

[56] References Cited

UNITED STATES PATENTS

| | | | |
|---|---|---|---|
| 3,419,676 | 12/1968 | Macouski | 178/6.6 A |
| 3,469,028 | 9/1969 | Yamamoto | 178/6.6 A |
| 3,535,440 | 10/1970 | Watanabe | 178/6.6 A |
| 3,631,509 | 12/1971 | Marshall | 346/74 ES |

*Primary Examiner*—Bernard Konick
*Assistant Examiner*—Jay P. Lucas
*Attorney, Agent, or Firm*—Edward T. Connors

[57] ABSTRACT

A recorder wherein its marking circuit utilizes a triangular waveform modified in accordance with a desired half tone characteristic and shifted with respect to a threshold to provide marking signals of varying length representative of an analogue signal.

8 Claims, 9 Drawing Figures

FIG. 4, FIG. 5, FIG. 6

APPARATUS FOR HALF TONE MARKING ELECTROSTATIC PAPER

BACKGROUND OF THE INVENTION

The present invention relates to facsimile recording, and more particularly to an improved marking circuit for an electrostatic recording medium providing half tone copy.

Conventional facsimile systems consist of a mechanical-optical scanner which dissects the object copy line by line. Usually the copy is transported at a steady rate past the optical scanning mechanism. A small optical scanning aperture of element dimensions performs the line by line dissection of the total copy sheet. Light transmitted through the scanning aperture is directed to a photoelectric sensor. The output of the sensor is an amplitude varying electrical signal which is a representation of the optical densities in the copy.

The output of the photoelectric sensor described above is usually referred to as a base band or picture frequency signal. The base band signal is normally passed into a modem or processor for modulating a transmitter carrier frequency for transmission over a conventional communications network.

The signals are received and applied to a recorder which makes a copy or facsimile of the originally scanned copy. Many methods of recording this signal have been applied in facsimile systems. Photographic recording is one of the earliest and highest fidelity methods. Another common method is electrolytic recording in which the record sheet is marked by passing an electric current through the sheet. Pressure sensitive recording using carbon paper and plain paper or some equivalent thereto is still another common method of facsimile reproduction. Additional methods such as ink jet marking have been used.

One of the newest facsimile recording mechanisms is the so-called electrostatic recording. In the electrostatic method an electric charge is deposited on a dielectric coated sheet to produce a latent image representative of the originally scanned information. The latent image is developed by dusting the sheet with a visible powder toner which clings to the areas in the sheet where the charges are present. The toner is fixed on the sheet to make a permanent record usually by the application of heat.

In using such systems certain difficulties have occurred. For example, in the photographic system the materials used are relatively expensive since silver is employed in the recording medium. The electrostatic method uses less expensive materials but it is a black and white system and as such it is inherently more difficult to produce thereon a full gray scale or half tone pictures. Therefore, in electrostatic recording it has been necessary to resort to a different method which produces a picture similar to the picture produced by the screening process used in making printing pictures. The only practical way to achieve tone scale in electrostatic recording is by forming images of a plurality of spaced figures such as dots or dashes of various sizes. Thus a lighter tone is achieved by a plurality of small sized spaced dots while a darker tone is achieved by making larger sized dots. This system is called the constant frequency variable dot (CFVD) method of half tone or gray scale recording and has been used in the facsimile field for many years. The method of generating the various shades of gray from the uniform density dots is to hold the number of dots constant but to vary the size of the dot.

SUMMARY OF THE INVENTION

It is an object of the present invention to provide a marking circuit for providing half tone images on electrostatic recording paper.

In accordance with the present invention an apparatus is provided for making a plurality of dots or dashes at a uniform rate or frequency in which the size of the dots is varied so that the appearance of the copy varies in tone scale from white to black, the gradation being comparable to the gradation in a photographic copy thereby overcoming the limitation of the electrostatic method. This is achieved by an apparatus converting a square wave to a triangular wave which is, in effect, sampled at varying intervals along its altitude to provide different lengths of control signals. These control signals are used to vary the length of the mark. Actually by holding the marking current on in one instance for a short time and in the second instance for a long time, the second mark would be larger, but because of the stylus movement while current is on a longer mark is produced of the same width as the shorter mark. If the marks are made long enough a solid line is produced.

The present invention is advantageous in that high fidelity half tone images may be recorded on electrostatic paper normally able to produce only solid black on a white background.

A further object of the present invention is to provide an apparatus for providing a desired half tone compensation to provide an image of enhanced appearance.

In accordance with the further feature of the invention an apparatus is provided for providing marking currents with controlled departures from the signal previously made in that the signal producing the copy is modified to achieve a more pleasing appearance of the recorded copy. This is achieved by an apparatus for modifying the triangular wave of the present invention so that the generally linear shape of the sides of the triangular waves are made non-linear in shape.

Other objects and advantages of the invention will be apparent from the following description and from the accompanying drawing which shows, by way of example, an embodiment of the invention.

DESCRIPTION OF THE PREFERRED EMBODIMENT

Figure 1:
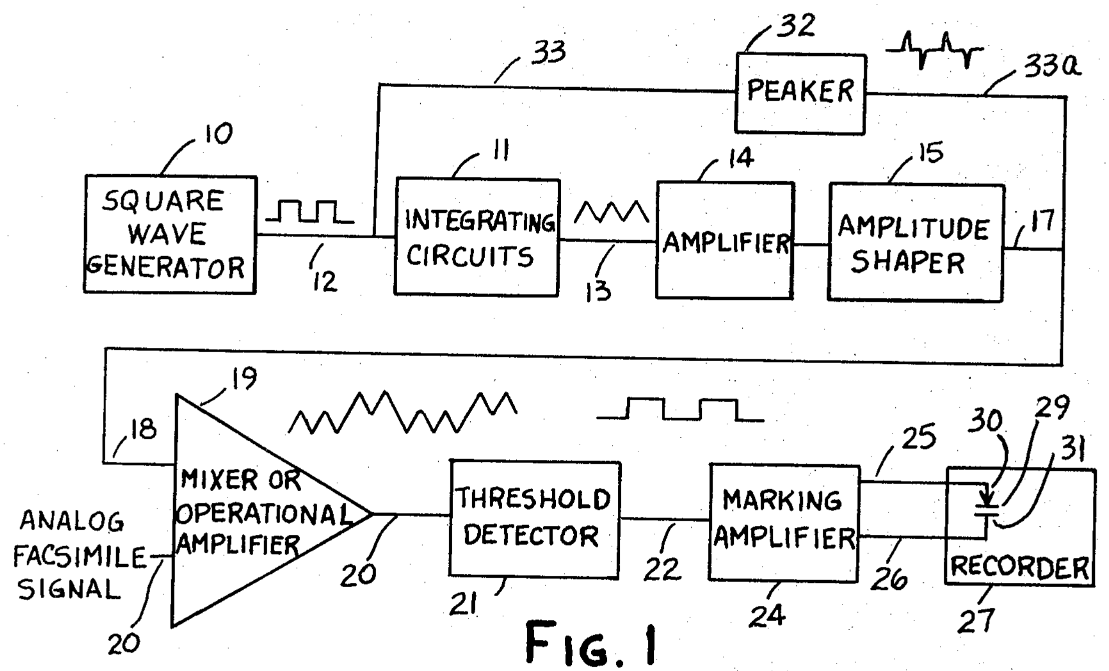
FIG. 1 is a block diagram of a facsimile recorder circuit responsive to an analogue facsimile signal for marking electrostatic recording paper in accordance with the invention.

Referring to FIG. 1 there is shown a facsimile recorder including a marking circuit in accordance with the invention.

The marking circuit includes a square wave generator 10 of suitable frequency supplying an integrated circuit 11 through a lead 12. The integrated output 13 is passed through an amplifier 14 and an amplitude shaper 15. Output 17 of the amplitude shaper 15 is directed to one of the inputs 18 of a mixer or operational amplifier 19. The other input 20 of the operational amplifier 19 is adapted to be supplied with an analogue facsimile signal. Output 20 of the operational amplifier 19 is connected to a threshold detector 21, its output 22 being connected through a marking amplifier 24 having output leads 25 and 26 to a recorder mechanism 27. Electrostatic marking paper 29 is marked in the recorder 27 between a stylus 30 and a platen 31. A peaker 32 including a resistor 32*a* and a capacitor 32*b* is connected to the output of the square wave generator 10 by lead 33. The output 17 of the amplitude shaper 15 is connected to the resistor 32*a* and the peaked output is connected by lead 33*a* to the mixer input 18.

Figure 2:
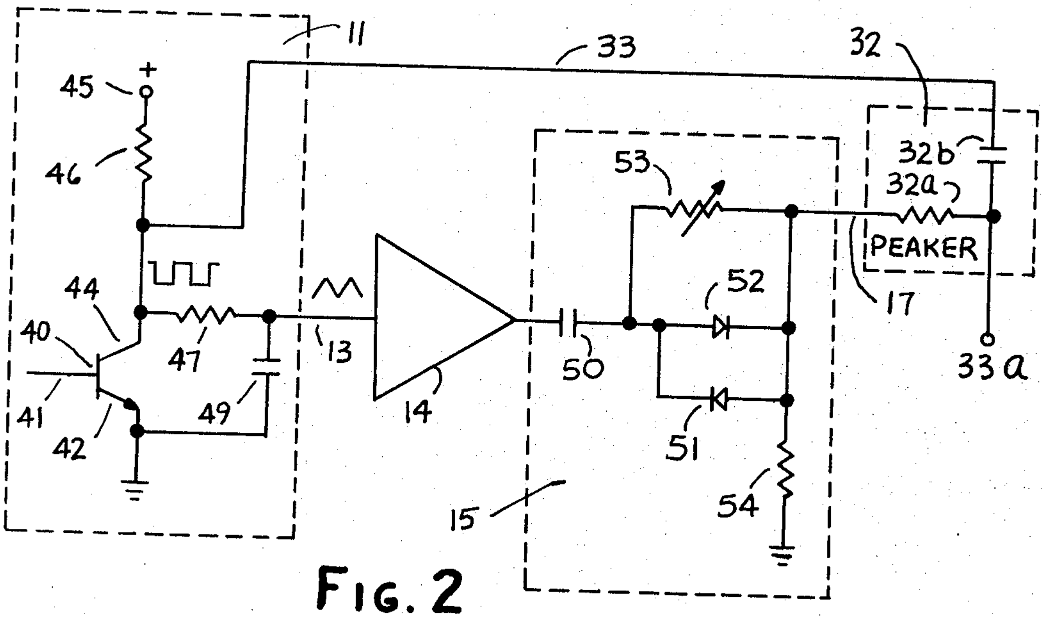
FIG. 2 is a schematic drawing illustrating the integrating circuit 11, the amplitude shaper 15, and the peaker 32 of FIG. 1.

The integrating circuit 11 is shown in schematic form in FIG. 2 and includes a transistor 40 having its input from the square wave generator 10 applied to its base 41. Its emitter 42 is grounded. Collector 44 is connected to a power supply 45 through a resistor 46. The output of the collector 44 is connected through integrating components resistor 47 to the capacitor 49, the other side of capacitor 49 being connected to ground. The amplitude shaper 15 follows the amplifier 14 being coupled thereto through a capacitor 50. The amplitude shaper 15 includes a pair of oppositely connected diodes 51 and 52 connected in parallel with a variable resistance 53 and through resistor 54 to ground.

Figure 3:
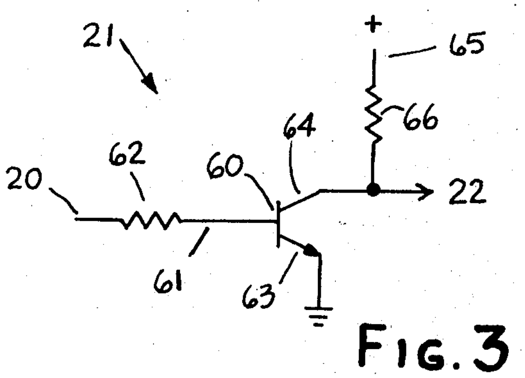
FIG. 3 is a schematic drawing illustrating the threshold detector 21 of FIG. 1.

The threshold detector 21 shown in schematic form in FIG. 3 includes a NPN transistor 60 having the output 20 of the operational amplifier 20 connected to its base 61 through a resistor 62. Emitter 63 is grounded and collector 64 is connected to a power supply 65 through a resistor 66.

In the operation of the marking circuit a facsimile analogue signal is applied to the mixer or operational amplifier 19. The analogue signal as shown in the waveform of FIG. 7 may represent full black copy at 70, gray or half tone at 71, full white at 72, full black at 73, off white at 74, and dark gray at 75.

Figures 4, 5, 6:
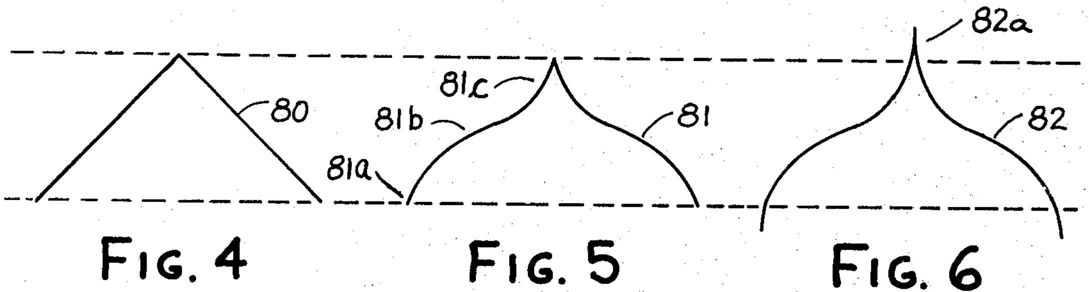
FIG. 4 illustrates the triangular waveform produced by the integrating circuit.
FIG. 5 illustrates the triangular waveform after being shaped.
FIG. 6 illustrates the shaped waveform of FIG. 5 after a spike has been applied thereto in the peaker.

The analogue signal 70 – 75 is mixed with a control signal 80 in the operational amplifier 19. This control signal 80 is originated in the square wave generator 10, integrated in the integrating circuit 11 to form the triangular waveform 80 as shown in FIG. 4. The triangular waveform 80 has sides of linear shape. In the amplitude shaper 14 the triangular waveform 80 is given a desired non-linear shape 81 as shown at 81 in FIG. 5. The waveform 81 is then given a spike 82*a* by the peaker 32 to form the waveform 82 of FIG. 6.

Figures 7, 8, 9:
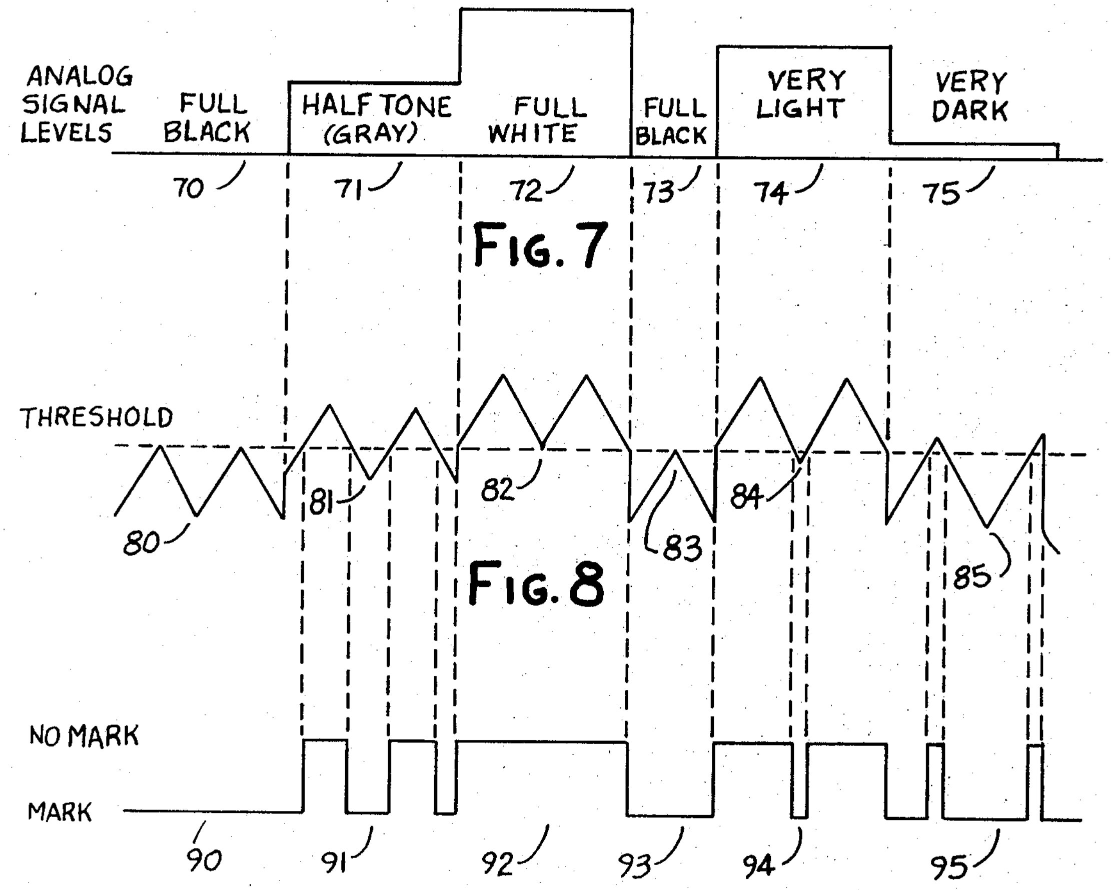
FIG. 7 is a waveform of an analogue signal.
FIG. 8 is a waveform produced by the operational amplifier 19.
FIG. 9 is a waveform produced by the threshold detector 21 and applied to the marking amplifier 24.

In the mixer or operational amplifier 19 the peaked waveform 81 is mixed with the analogue signal 70 – 75 to form the signal 80 – 85 as shown in FIG. 8 in which corresponding portions of the signal are identified with the same unit place numerals as used in FIG. 7.

Assuming that it is desired to operate the circuit without the use of the amplitude shaper 15 and the peaker 32, the waveform applied to the mixer 19 is of triangular shape, the slopes being linear. The time constant of RC (47 and 49) is long with respect to the period of the square wave so that integration results in a near perfect triangular waveform. In the mixer 19 the composite analogue and triangular waveforms produce a signal of constant peak-to-peak amplitude but the instantaneous level with respect to a reference level varies linearly with respect to the analogue signal level. So the triangular signal assumes various positions or levels with respect to a threshold as indicated at 80 – 85.

The signal 80 – 85 is applied to the threshold detector 21 and produces a series of output pulse signals of varying width as shown at 90 – 95 in FIG. 9 in which corresponding portions of the signal are identified with the same unit place numerals as used in FIG. 8. With a perfect triangular waveform the length of the output pulses 90 – 95 will vary linearly with the amplitude of the input facsimile signal. Various implementations of a pulse modulator or mixer-threshold may be used.

In the simplified schematic of FIG. 2 the R-C integrating circuit 11 integrates the square waves. The amplifier 14 is known in the art as is operational amplifier 19 which has a high gain fixed threshold output. The amplifier 14 amplifies the integrated waveform and sets its level with respect to a reference. The threshold detector 21 switches quickly from one state to the opposite when the threshold is reached so that its output signal 90 – 95 is a series of rectangular waveforms of varying pulse widths. This signal is applied to the stylus 30 through the electrostatic type marking amplifier 24.

Improved shading of the copy is provided by the amplitude shaper 15. It is used to provide controlled departures from linearity of the input signal with respect to transmitted copy density to achieve the most desirable results, so as for example, to "open up" the middle gray tones and compress the light and dark tones. Another advantage of the shaped waveform is that adjustments of the system at the black and white ends of the gray scale become less critical since mal-adjustments at the ends of the range produce smaller relative changes in the output signal.

In the amplitude shaper 15 the integrated waveform 80 is shaped as indicated at 81. It will be noted that the start of the waveform 80 as indicated at 81*a* and the area adjacent the apex as indicated at 81*c* are steepened and thus result in lesser changes in output pulse widths than displacements in the intermediate region 81*b* and have the aforesaid effect of "opening up" the middle gray tones and of compressing the lighter gray and dark gray tones.

A further improvement in the copy is achieved by the use of the peaker 32 which has the effect of adding the spikes 82*a* to the waveform 82 of FIG. 6. Through the use of the peaker circuit these "spike" pulses are superimposed on the shaped waveform output at 17 in the common lead resistor 54 of FIG. 2 across which the final output is developed. It will be noted that the phase of the triangular integrated waveforms 80 – 82 and the spikes 82*a* from the differentiator or peaker 32 is such that the spike pulse adds on at the peak or apex of the triangular waveform. Several advantages result from the addition of the spike 81a to the shaped waveform 81 to form the waveform 82. The less critical nature of the end point adjustments referred to above is extended even further. Also, the range of the system between limits is extended to include almost any conceivable usable signal without running into an abrupt threshold ("brick wall") at either the white or black limit. In other words the facsimile recording system is maintained in a dynamic state at all signal levels.

While the invention has been described and illustrated with reference to specific embodiments thereof it is to be understood that other embodiments may be resorted to without departing from the invention. Therefore, the form of the invention set out above should be considered as illustrative and not as limiting the scope of the following claims.

I claim:

1. In a facsimile recorder including a marking circuit of the type adapted to be supplied by an analogue facsimile signal and including means for providing a square wave clock signal, means for integrating the square wave clock signal to produce a triangular waveform, means providing a voltage reference, means to shift the triangular waveform in amplitude with reference to said voltage reference responsive to the magnitude of said analogue signal to produce signals of varying time duration, and means to use said signals of varying time duration to produce marking currents, whereupon the duration of the marking pulses vary in length and are centered on the altitude of the triangular waveform so that a screen effect is achieved in the marked copy, the improvement comprising means for producing a modified waveform having a non-linear shape from said triangular waveform, said non-linear shape in accordance with a desired half tone characteristic, and means to use said modified waveform to produce said signals of varying time duration.

2. A facsimile recorder according to claim 1 in which is included means for producing spikes on said non-linear shaped waveform so as to render better tonal quality in case of misadjustment of signal level.

3. A facsimile recorder according to claim 2 in which said means for producing spikes on said modified waveform is a differentiating circuit for said square waveform.

4. A facsimile recorder according to claim 1 in which said means for producing a waveform of non-linear shape from said triangular waveform is an amplitude shaper.

5. A facsimile recorder according to claim 4 in which said amplitude shaper is a pair of opposed diodes connected in parallel with a resistor network.

6. A facsimile recorder according to claim 1 in which said means to shift said modified triangular waveform is an operational amplifier.

7. A facsimile recorder according to claim 1 in which said means to use said signals of varying time duration to produce marking pulses incorporates the base to emitter circuit of a transistor.

8. In a facsimile recorder including a marking circuit of the type adapted to be supplied by an analogue facsimile signal and including means for providing a square wave clock signal, means for integrating the square wave clock signal to produce a triangular waveform, means providing a voltage reference, means to shift the triangular waveform in amplitude with reference to said voltage reference responsive to the magnitude of said analogue signal to produce signals of varying time duration, and means to use said signals of varying time duration to produce marking currents, whereupon the duration of the marking pulses vary in length and are centered on the altitude of the triangular waveform so that a screen effect is achieved in the marked copy, the improvement comprising means for producing a modified waveform having a non-linear shape from said triangular waveform, said non-linear shape in accordance with a desired half tone characteristic, the rise time of the leading edge of said modified triangular waveform steeper both at the base and apex thereof and flatter at its intermediate portion as compared to the linear rise time of the unmodified triangular waveform, and means to use said modified waveform to produce said signals of varying time duration.

* * * * *